June 19, 1934.  A. H. CORBET  1,963,830
REMOVABLE COVER OR ROOF FOR VEHICLES
Filed May 22, 1933  2 Sheets-Sheet 1
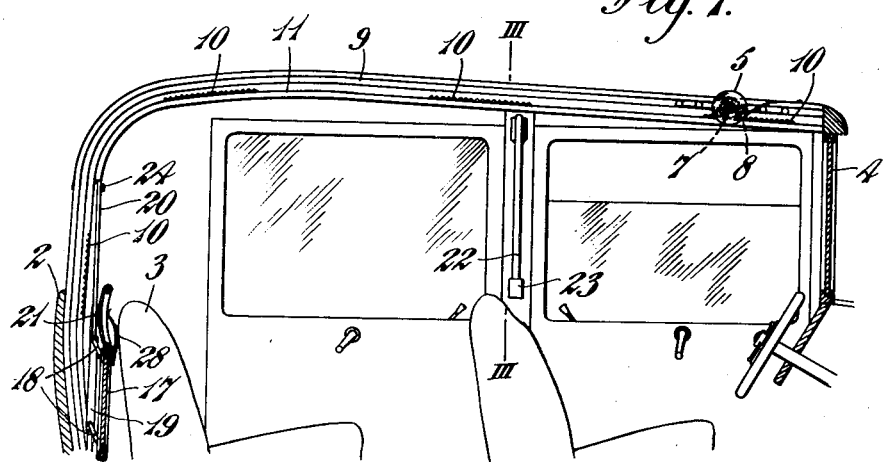
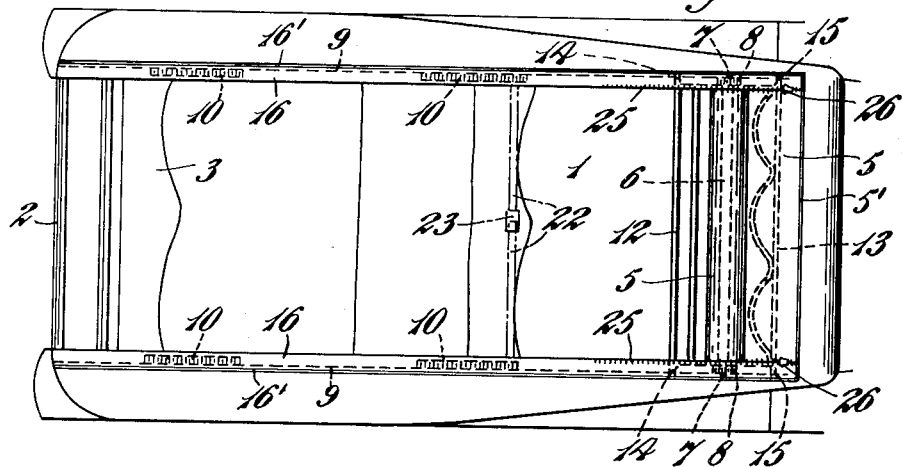
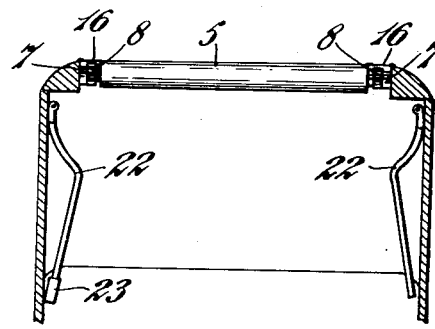
INVENTOR
Archer H. Corbet
By 
ATTORNEY

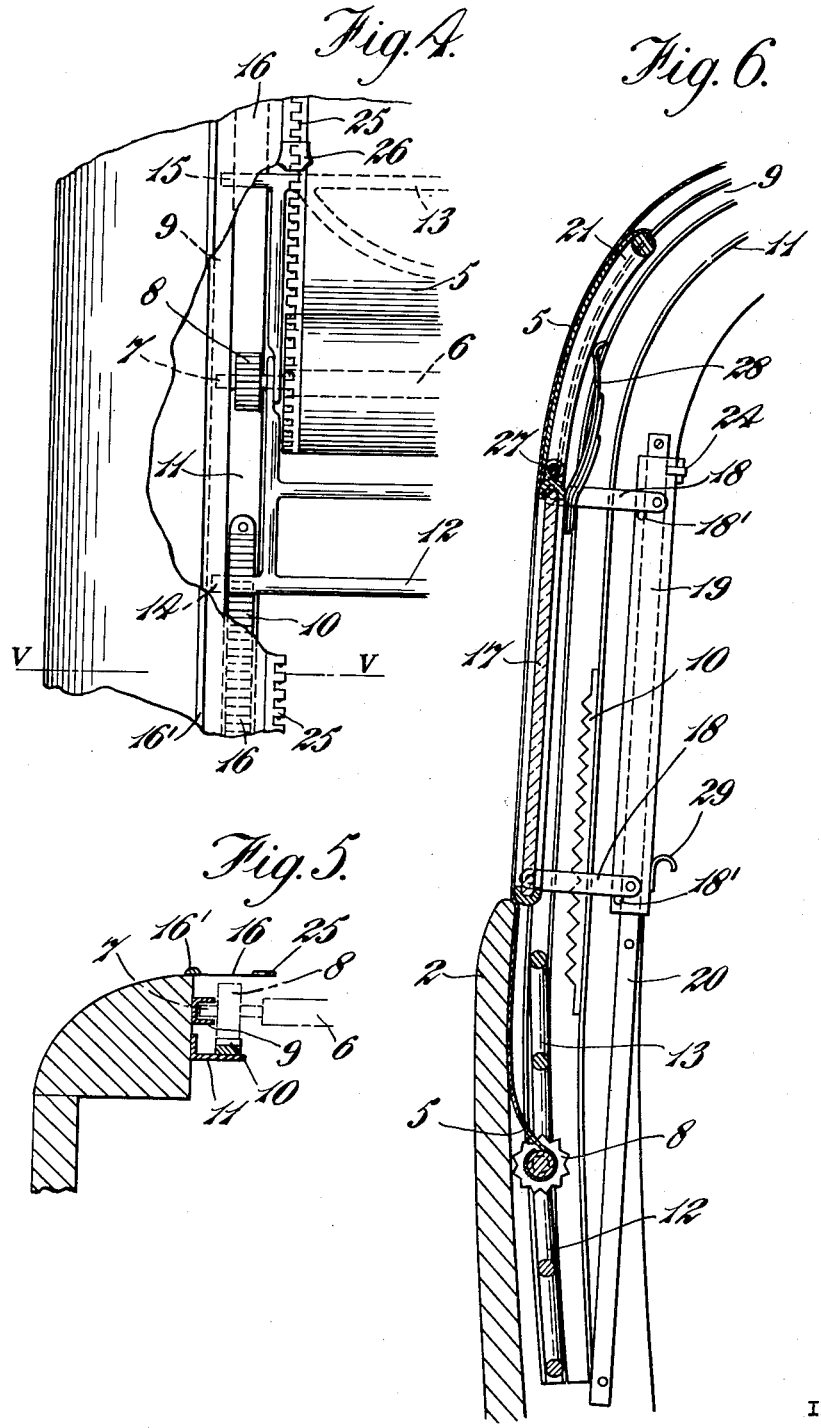

Patented June 19, 1934

1,963,830

UNITED STATES PATENT OFFICE 1,963,830

REMOVABLE COVER OR ROOF FOR VEHICLES

Archer Henry Corbet, Lymington, England

Application May 22, 1933, Serial No. 672,284
In Great Britain June 4, 1932

20 Claims. (Cl. 296—98)

This invention relates to removable covers or roofs for vehicles, of the kind comprising a flexible sheet that is drawn over or away from an opening in the upper part or roof of the vehicle, and has for one of its objects the provision of an improved cover or roof of this kind which can be extended or retracted very rapidly and simply from the interior of the vehicle.

In arrangements of this kind heretofore suggested, the flexible sheet has been retracted by rolling it on to a roller mounted in bearings fixed to the vehicle frame. In order to extend and retract such flexible sheet, winding means have been provided, which render the extension or retraction of the sheet a somewhat slow operation, and involve the use of somewhat expensive mechanical devices.

According to my invention, one end of the flexible sheet is secured to one edge of the opening in the upper part or roof of the vehicle, the other end is attached to a roller which is adapted to receive a movement of translation between guides provided at the sides of said opening and to roll up or to unroll the flexible sheet during such movement of translation, and means are provided whereby the roller, when it is moved between the guides in a direction to retract the flexible sheet, is turned to roll said sheet on to the roller, said means being operative only when the roller is being given a movement of translation.

According to one form of my improved cover or roof, the roller is provided with trunnions which slide in guides provided at the sides of such opening.

According to another form of my improved cover or roof, the roller on to which or from which the flexible sheet is rolled or unrolled is rotatably carried on a frame having outwardly-extending lugs that slide in guides provided at the sides of the opening in the upper part or roof of the vehicle.

In order to roll up the flexible sheet when the roller is moved in a direction to retract the sheet, the roller may be provided at its ends or on its trunnions with pinions that engage with rack-bars suitably located at the sides of the opening in the upper part or roof of the vehicle, a series of rack-bars being provided at each side of said opening, the rack-bars of each series being suitably spaced apart from one another.

Or the ends of the roller, or friction wheels mounted thereon or on the trunnions of the roller, may be made to bear with a sufficient amount of friction against rails provided at the sides of the opening in the upper part or roof of the vehicle to cause the flexible sheet to be rolled on to the roller when it is moved in a direction to retract the flexible sheet, but to allow slip when there is a difference between the diameter of the roll formed by the sheet and that of the ends of the roller or of the friction wheels mounted thereon or on the trunnions of the roller, thus automatically effecting the compensation necessary for permitting convenient and rapid rolling up of the flexible sheet. The surfaces of the rails which engage with the ends of the roller or with the friction wheels may be made of soft or other vulcanized India rubber and the ends of the roller, which may be of larger diameter than the intermediate portion thereof, or the friction wheels mounted on the ends of the roller or on its trunnions may be made of metal or other material capable of engaging the rails with the requisite amount of friction. If desired the rails may be made of metal, wood or other suitable material, and the ends of the roller provided with friction wheels made of soft or other vulcanized India rubber or other suitable material. The rails for engaging with the ends of the roller, or the friction wheels mounted thereon or on the trunnions of the roller are so spaced apart from the abovementioned guides that the required pressure is produced between the rails and the ends of the roller, or the friction wheels. If desired, however, the roller may be rotatably mounted on a frame, and the arrangement of the projections on the frame and the position of the roller in the frame may be such that the necessary pressure to provide the frictional grip required for turning the roller will be produced by pressing the end surfaces of the roller or the friction wheels thereon on to the rails when the frame is grasped and actuated. Frictional means, such as spring brake surfaces connected to the movable frame and sliding in the guides, may be provided to prevent too rapid movement of the roller.

When the flexible sheet is partially or fully extended its longitudinal edges are advantageously secured to strips of flexible material secured along the longitudinal edges of the opening in the roof by means of fasteners of the type wherein series of interengaging members are brought into and out of engagement with one another by means of a movable slider. The sliders may be actuated by hand; or they may be connected to links or arms mounted on the roller or on the frame connected thereto, so that the longitudinal edges of the flexible sheet are automatically secured or released when the sheet is extended or retracted.

In order that my invention may be fully understood, reference will be made to the accompanying drawings, in which Figure 1 is a diagrammatic sectional elevation of the upper part of an automobile of the saloon or closed type provided with one form of my improved removable cover or roof, and Figure 2 is a plan view of such automobile.

Figure 3 is a section taken on the line III—III, Figure 1.

Figure 4 is a plan drawn to an enlarged scale with part broken away showing the roller and adjacent parts.

Figure 5 is a section taken on the line V—V, Figure 4.

Figure 6 is a partial sectional elevation, drawn to an enlarged scale, of the rear wall or panel of the automobile.

As shown in Figures 1 and 2, the upper part or roof of the automobile is provided with an opening 1 which extends from that part of the rear panel 2 which is level with the top of the squab or vertical cushion 3 of the back seat to within a short distance of the wind screen 4. One end of a flexible sheet 5 is secured, for example, by means of beading 5', to the edge of the opening 1 adjacent the wind screen 4, whilst the other end of the flexible sheet 5 is attached to a metal or other roller 6 which is provided with trunnions 7 having fixed pinions 8 thereon. The ends of the trunnions 7 slide in suitably shaped guides 9 provided at the sides of the opening 1, such guides extending to a position close to the floor of the automobile, whilst the pinions 8 engage with rack-bars 10 secured on flanges 11 which extend parallel with the guides 9. The rack-bars 10 are of such length and are so spaced apart from one another that the flexible sheet 5 is rolled on or off the roller 6 when the latter is moved in the requisite direction.

In order that the roller may be conveniently moved, frames 12, 13 are mounted on the trunnions 7 on either side of the roller 6. These frames 12, 13 are provided with outwardly-extending lugs 14, 15 respectively which slide in the guides 9, and in this manner the roller 6 is maintained substantially at right angles to the guides 9 and rack-bars 10. The lugs 14, 15 may if desired be provided with guide rollers at their ends. As shown more clearly in Figure 4, the frames 12, 13 are pivotally mounted on the trunnions 7 so that the frames 12, 13 and rollers 6 are able to move over the curved portion of the guides 9. If desired, a suitable braking device may be provided to prevent too rapid movement of the roller when it is passing between the rack-bars 10. For example, channels having outwardly-flared ends may be provided in the spaces between the rack-bars, in which slide with the required amount of friction suitably-shaped braking blocks secured to the frame 12 or to the trunnions 7.

Series of interengaging members 25 that are brought into and out of engagement with one another by movable sliders 26 are arranged along the edges of the flexible sheet 5 and of strips of flexible material 16 secured along the longitudinal edges of the opening 1 by means of beading 16'. The sliders 26 may be moved by hand, in which case they may be operated from the inside or the outside of the automobile, or they may be moved by means of arms or links (not shown) pivotally mounted on the trunnions 7 or on the roller 6 or on the frame 13, so that the angles which said arms or links make with the plane of the interengaging members 25 can adjust themselves independently of the frame 13, and the edges of the sheet 5 are automatically secured or released as the sheet is extended or retracted, the sliders in this case being operated from the inside of the automobile.

A window is advantageously provided at the rear of the automobile, and the window sash is vertically-adjustable so that it can be housed between the rear panel 2 and the squab 3, when the flexible sheet 5 is in a retracted position, and can be raised up and pressed against the flexible sheet when such sheet is fully extended, an aperture being provided in the flexible sheet, which aperture, when the sheet is unrolled and the window sash is raised, registers with the window, so that a view behind the automobile is obtainable from the interior thereof.

In the constructional form illustrated in the drawings, the window sash 17 is movably supported by means of arms 18 which are pivotally connected to the vertical sides of the window sash 17 and to members 19 of U-shaped cross-section that are adapted to slide on guide bars 20 which are secured to the body of the automobile, at a sufficient distance from the rear panel 2 to allow the roller 6 to pass between them and the rear panel. As shown in Figure 6 the roller 6, when in such position that the flexible sheet 5 is completely unrolled, is housed a short distance from the floor of the automobile, so that the frame 13 mounted on the roller can be reached by the hand conveniently. A suitably-shaped metal framework 21 is secured to the top member of the window sash 17 so that, when the flexible sheet 5 is drawn across the opening 1, and, by moving upwards the members 19 and swinging the window sash 17 upwards and backwards on its pivotal arms 18 towards the rear of the automobile, the window sash 17 is brought to its raised position and is pressed against the flexible sheet 5, the said framework 21 gives the flexible sheet 5 at the rear of the automobile the required shape and tautness, as shown in Figure 6. Lugs 18' are suitably provided on the members 19 to limit downward movement of the arms 18. The flexible sheet may also be supported by folding arms 22 (Figures 1, 2 and 3), which are mounted on the inner sides of the door posts and which meet and are suitably held together when in their raised position, for example, by the sleeve 23. The supporting framework 21 may be integral with the window sash or it may be removably mounted thereon. Preferably, the framework 21 is pivotally mounted on the top member of the window sash and is yieldingly held against the flexible sheet 5. In this manner lowering of the window sash 17 is facilitated. In the constructional form shown in the drawings, the framework 21 is pivotally mounted on a bar or rod 27 fixed on the top member of the window sash 17 and is yieldingly held against the flexible sheet 5 by leaf springs 28. In a further constructional form, downwardly-extending projections of the framework 21 extend into tubular guides in the side members of the window sash 17 and the framework 21 is pressed upwardly by the action of coil springs arranged in said guides. The window sash 17 may be maintained in its raised position in any suitable manner, for example, as shown in the drawings by means of catches 24 which are secured to the body of the automobile and which engage holes suitably provided at the top of the members 19. Suitably-shaped handles or hooks 29 are secured to the members 19 so that the window sash 17 can be raised conveniently.

It will be understood that other means than those described may be used for raising the window sash 17 and maintaining such window sash in its raised position. For example, the members 19 may be of rectangular cross-section and slide in guides which are of such shape that the members 19 when in their raised position, can be moved towards the rear of the automobile and be supported on a suitably-positioned transversely-extending supporting member. Or the lower member of the window sash 17 may engage with suitable rests when in its elevated position in engagement with the extended flexible sheet. If desired part of the squab 3 adjacent the window sash 17 can be made to fold forwards on to the rear seat.

If desired, means can be provided to collect any water which may pass through the joints between the flexible sheet 5 and the strips of flexible material 16 to which such sheet is secured. Such means, which may be fixed or movable, may comprise gulleys provided with one or more drain pipes and secured to the body of the vehicle by means of pins sliding in suitable sockets or guides, so that the gulleys may easily be brought beneath the joints and moved away therefrom as desired. The said sockets or guides can be arranged in holes in the coachwork, or they may be mounted on a metal strip secured to the coachwork.

If desired, the pinions 8 may be connected to the trunnions 7 through free-wheel clutches so that the roller 6 is not rotated by the interaction of the pinions 8 with the racks 10 when the flexible sheet 5 is being extended. Moreover, more than one pair of guides may be provided at the sides of the opening 1. For example, two pairs of guides may be provided, the trunnions 7 and the lugs 14, for example sliding in one pair and the lugs 15 sliding in the other pair. Or three pairs of guides may be provided, the lugs 14, the lugs 15 and the trunnions 7 sliding in separate guides. Furthermore, if desired, the frames 12, 13 may be each provided with four or more outwardly-extending lugs adapted to slide in the said guides, whilst the rollers 6 may be made of tubular form with end pieces detachably mounted therein, such end pieces bearing the pinions 8 and trunnions 7.

In one form of construction in accordance with my invention the pinions for engaging the stationary racks are mounted on the ends of the roller, preferably on reduced end portions thereof, and the roller is rotatably mounted on a spindle, which may or may not rotate as it moves along the guides in which its ends are adapted to slide.

In a further constructional form in accordance with my invention the roller is provided with trunnions which slide in the guides at the sides of the opening and is rotatably mounted in a casing having an aperture through which the flexible sheet extends, means being provided for turning the roller as it is moved between the guides in a direction to retract the flexible sheet, so that such sheet is rolled on to the roller, said means being operative only when the roller is being given a movement of translation. The casing may be held at an end or at any intermediate position in the opening in the upper part or roof of the vehicle by means of suitable hooks or clips. The ends of the casing may be provided with projections or rollers or shoes to slide in the guides at the sides of the opening, and in cases where two or more rollers are employed, suitable means may be provided for preventing the ingress of water at the places where the roller casings abut against or engage one another or the adjacent parts of the automobile, for example the abutting faces can be provided with India rubber packing.

The front end of the flexible sheet is preferably secured to the edge of the opening adjacent the windscreen, as shown in the drawings and it may be protected by means of a suitable cowl plate arranged behind the windscreen, the roller being attached to the rear end of the flexible sheet. The opposite arrangement of the ends of the flexible sheet can however be adopted if desired.

Instead of employing rack-bars 10 spaced apart from one another, a single rack at each side of the opening 1 and extending over a part only of the length of said opening may be employed, the racks being of such length and so positioned at the sides of the opening 1 that the flexible sheet is rolled up to the requisite extent when the roller is moved in a direction to retract the flexible sheet.

In the form of my improved cover or roof in which the roller is rotatably carried on a frame having outwardly extending lugs that slide in the guides at the sides of the opening in the upper part or roof of the vehicle, the roller is advantageously rotatably mounted on the frame by means of inwardly-extending projections at one end of each of the side members of the frame, such projections engaging in bearings in the ends of the roller, and two outwardly-extending lugs are provided on each of said side members near the inwardly-extending projections, whilst arms having an outwardly-extending lug which is adapted to slide in the guides are pivotally mounted on the ends of the side members of the frame remote from the roller. In this manner parallelism of the frame is maintained during its movement along the guides whilst it is able to move along a curved portion thereof. Also in this form of my improved cover or roof, links or arms may be pivotally mounted on the roller or on the frame carrying the roller, and connected to the sliders of the fasteners of the flexible sheet, so that movement of the frame moves the sliders and automatically releases or secures the edges of such flexible sheet.

The guides which are provided at the sides of the opening in the upper part or roof of the vehicle and which extend close to the floor of the automobile may be secured to strips of wood or other suitable material which are mounted on the sides of said opening and which may, if desired, be braced together by means of transversely-extending members suitably located at the rear of the automobile. In the form of my invention in which the ends of the roller, or friction wheels mounted thereon or on trunnions of the roller, engage with rails provided at the sides of the opening, such rails may be formed of soft or other vulcanized India rubber mounted on metal strip, and, if desired, the guide at each side of the opening, the strip to which it is secured, and the corresponding rail may be formed of metal such as pressed steel and two or more of such members may be formed or combined together. The rails are preferably located on the sides of the guides remote from the top of the fixed roof of the automobile, but such rails may be located between the guides and the top of the fixed roof of the automobile. Similarly in cases where racks and pinions are employed, the racks may be arranged above or on the other side of the pinions. In such cases, the guides may be so arranged that the sheet, when rolled on the roller, lies with the plane of the lateral strips tangential to the periphery of the rolled sheet. If desired, the guides 9 may be housed within a recess in the body of the automobile, and such guides and the flange 11 may be formed or combined together.

By my invention, the flexible sheet can be operated easily from the interior of the automobile. Moreover, the opening in the upper part or roof of the automobile can be made of large dimensions, and can, if desired, be extended to that part of the rear panel level with the top of the squab. By this means, the very noticeable draughts at the backs of travellers, which occur when the opening is comparatively small, can be obviated. Moreover, the flexible sheet may be partially extended, so that the opening in the roof proper of the automobile is closed whilst the opening at the rear of the automobile is uncovered. In this manner the heads of travellers can be protected from the sun whilst air is allowed to circulate freely through the automobile. Furthermore, an automobile of the closed or saloon type fitted with my improved removable cover or roof, when the flexible sheet is fully extended and its longitudinal edges secured to the edges of the opening, closely resembles an automobile of the saloon type of which the whole head or roof is stationary.

Although my invention has been described more particularly in its application to automobiles, it will be understood that it may be applied to other vehicles, for example, caravans, and yachts, motor boats, aeroplanes and other vehicles or vessels where a light movable roof is desired.

I claim:

1. A removable cover for vehicles, of the kind comprising a flexible sheet that is capable of being drawn over and away from an opening in the upper part or roof of the vehicle, wherein one end of the flexible sheet is secured to one edge of said opening, the other end of the flexible sheet is attached to a roller, which is adapted to receive a movement of translation between guides provided at the sides of said opening and to roll up and to unroll the flexible sheet during such motion of translation, and means whereby the roller, when it is moved between the guides in a direction to retract the flexible sheet, is turned to roll said sheet on to the roller, said means being operative only when the roller is being given a movement of translation.

2. A removable cover according to claim 1, wherein the roller is provided with trunnions which slide in the guides at the sides of said opening and the roller is rotatably mounted in a casing having an aperture through which the flexible sheet extends.

3. A removable cover for vehicles, of the kind comprising a flexible sheet that is capable of being drawn over and away from an opening in the upper part of the vehicle, wherein one end of the flexible sheet is secured to one edge of said opening, the other end of the flexible sheet is attached to a roller which is provided with trunnions that slide in guides provided at the sides of said opening, and means are provided whereby the roller, when it is moved between said guides in a direction to retract the flexible sheet, is turned to roll such sheet on to the roller, said means being operative only when the roller is being given a movement of translation.

4. A removable cover according to claim 3, wherein frames having outwardly-extending lugs that slide in the guides are pivotally-mounted on either side of the roller.

5. A removable cover according to claim 3, wherein the means for turning the roller comprise pinions mounted at the ends of the roller, and a series of rack-bars located at each side of the opening in the upper part of the vehicle, the rack-bars of each series being suitably spaced apart from one another.

6. A removable cover for vehicles, of the kind comprising a flexible sheet that is capable of being drawn over and away from an opening in the upper part of the vehicle, wherein one end of the flexible sheet is secured to one edge of said opening, the other end of the flexible sheet is attached to a roller which is provided with trunnions that slide in guides provided at the sides of said opening and wherein frames, which have outwardly-extending lugs that slide in said guides, are pivotally mounted on either side of the roller, and means are provided whereby the roller, when it is moved between said guides in a direction to retract the flexible sheet, is turned to roll such sheet on to the roller, said means comprising pinions which are fixed on the trunnions of the roller, and a series of rack-bars located at each side of the opening in the upper part of the vehicle, the rack-bars of each series being suitably spaced apart from one another.

7. A removable cover according to claim 3, wherein the ends of the roller are made to bear with a sufficient amount of friction against rails provided at the sides of the opening in the upper part of the vehicle to cause the flexible sheet to be rolled on to the roller when it is moved in a direction to retract the flexible sheet, but to allow slip when there is a difference between the diameter of the roll formed by the sheet and that of the ends of the roller.

8. A removable cover for vehicles, of the kind comprising a flexible sheet that is capable of being drawn over and away from an opening in the upper part of the vehicle, wherein one end of the flexible sheet is secured to one edge of said opening, the other end of the flexible sheet is attached to a roller which is rotatably carried on a frame having outwardly-extending lugs that slide in guides provided at the sides of said opening, and means are provided whereby the roller when the frame carrying the roller is moved along the guides in a direction to retract the flexible sheet, is turned to roll such sheet on to the roller, said means being operative only when the roller is being given a movement of translation.

9. A removable cover according to claim 8, wherein the roller is mounted on inwardly-extending projections at one end of the side members of the frame, each of which is provided with two outwardly-extending lugs near the inwardly-extending projection, and arms having an outwardly-extending lug are pivotally mounted on the ends of the side members of the frame remote from the roller.

10. A removable cover according to claim 8, wherein the means for turning the roller comprise pinions mounted at the ends of the roller, and a series of rack-bars located at each side of the opening in the upper part of the vehicle, the rack-bars of each series being suitably spaced apart from one another.

11. A removable cover for vehicles, of the kind comprising a flexible sheet that is capable of being drawn over and away from an opening in the upper part of the vehicle, wherein one end of the flexible sheet is secured to one edge of said opening, the other end of the flexible sheet is attached to a roller rotatably mounted on a spindle the ends of which slide in guides provided at the sides of said opening, and means are provided whereby the roller, when it is moved between said guides in a direction to retract the flexible sheet, is turned to roll such sheet on to the roller, said means being operative only when the roller is being given a movement of translation.

12. A removable cover according to claim 11, wherein the means for turning the roller comprise pinions mounted at the ends of the roller, and a series of rack-bars located at each side of said opening, the rack-bars of each series being suitably spaced apart from one another.

13. An automobile of the saloon type wherein the roof is provided with an opening which extends from within a short distance of the windscreen to the part of the rear panel which is substantially level with the top of the squab, one end of a flexible sheet is secured to the edge of the opening adjacent the windscreen, the other end of the flexible sheet is attached to a roller which is adapted to receive a movement of translation between guides which are provided at the sides of said opening and which extend close to the floor of the automobile, and means are provided whereby the roller, when it is moved between said guides in a direction to retract the flexible sheet, is turned to roll such sheet on to the roller, said means being operative only when the roller is being given a movement of translation.

14. An automobile according to claim 13, wherein the means for turning the roller comprise pinions which are mounted at the ends of the roller and a series of rack-bars located at each side of said opening, the rack-bars of each series being suitably spaced apart from one another.

15. An automobile according to claim 13, wherein a window is provided at the rear of the automobile, the window sash is vertically-adjustable so that it can be housed between the rear panel and the squab when the flexible sheet is in a retracted position and can be raised up and pressed against the flexible sheet when such sheet is fully extended, and an aperture is provided in the flexible sheet, which aperture, when the sheet is unrolled and the window sash is raised, registers with the window.

16. An automobile according to claim 13, wherein a window is provided at the rear of the automobile, the window sash is vertically-adjustable so that it can be housed between the rear panel and the squab when the flexible sheet is in a retracted position and can be raised up and pressed against the flexible sheet when such sheet is fully extended, a suitably-shaped framework is provided at the top of the window sash, so that when the flexible sheet is extended and the window sash is raised, said framework supports the flexible sheet at the rear of the automobile, and an aperture is provided in the flexible sheet, which aperture, when the sheet is unrolled and the window sash is raised, registers with the window.

17. An automobile according to claim 13, wherein the roller is provided with trunnions which slide in the guides at the sides of said opening and the means for turning the roller comprise pinions which are mounted on said trunnions, and a series of rack-bars located at each side of said opening, the rack-bars of each series being suitably spaced apart from one another.

18. A removable cover for vehicles, of the kind comprising a flexible sheet that is capable of being drawn over and away from an opening in the upper part or roof of the vehicle, wherein one end of the flexible sheet is secured to one edge of said opening, the other end of the flexible sheet is attached to a roller provided with trunnions which are adapted to slide in guides provided at the sides of said opening, and means are provided whereby the roller, when it is moved in a direction to retract said sheet, is turned to roll said sheet on to the roller, said means comprising pinions mounted on said trunnions, and a series of rack-bars located at each side of said opening, the rack-bars of each series being suitably spaced apart from one another.

19. A removable cover according to claim 18, wherein one end of the flexible sheet is secured to the front or leading edge of the opening in the upper part of the vehicle.

20. A removable cover for vehicles, of the kind comprising a flexible sheet that is capable of being moved to close and open an aperture in the upper part or roof of the vehicle, wherein one end of the flexible sheet is secured to one edge of said aperture, the other end of the flexible sheet is attached to a roller which is adapted to receive a movement of translation between guides provided at the sides of said aperture and to roll up and to unroll the flexible sheet during such motion of translation, and means are provided whereby the roller, when it is moved between the guides in a direction to retract the flexible sheet, is turned to roll said sheet on to the roller, said means being operative only when the roller is being given a movement of translation and comprising pinions mounted at the ends of the roller and a single rack-bar located at each side of the said aperture and extending over a part only of the length of said aperture.

ARCHER HENRY CORBET.